United States Patent
Leung et al.

(10) Patent No.: US 7,047,869 B2
(45) Date of Patent: May 23, 2006

(54) METHOD OF MAKING COFFEE AND COFFEE MAKER

(75) Inventors: Chi Wah Leung, Chaiwan (HK); Chi Chung Fung, Chaiwan (HK); Shek Chuen Luk, Chaiwan (HK)

(73) Assignee: Simatelex Manufactory Co., Ltd., Chaiwan (HK)

( * ) Notice: Subject to any disclaimer, the term of this patent is extended or adjusted under 35 U.S.C. 154(b) by 332 days.

(21) Appl. No.: 10/078,613

(22) Filed: Feb. 19, 2002

(65) Prior Publication Data

US 2003/0157226 A1    Aug. 21, 2003

(51) Int. Cl.
  *A47J 31/00*    (2006.01)
  *A47J 31/30*    (2006.01)
(52) U.S. Cl. .............. 99/304; 99/305; 99/306; 99/307
(58) Field of Classification Search .......... 99/304, 99/305, 306, 307
  See application file for complete search history.

(56) References Cited

U.S. PATENT DOCUMENTS 5,408,917 A  * 4/1995 Lussi .................. 99/281
6,224,755 B1   5/2001 Schamberg et al. ......... 210/149

FOREIGN PATENT DOCUMENTS

DE    2952556    * 7/1981
FR    2558052    * 1/1985

* cited by examiner

*Primary Examiner*—Anthony Weier
(74) *Attorney, Agent, or Firm*—C. James Bushman; Browning Bushman P.C.

(57) ABSTRACT

A method of making coffee in a drip-type coffee maker includes introducing steam into coffee grounds, and passing heated water through the coffee grounds to infuse the water. A coffee maker includes a second water passage in which the flow of water is controlled so that it is converted into steam for delivery to the brew basket. The steam enters the brew basket below the level of any coffee grinds in the basket, and causes a substantially helical steam flow path in the grinds.

6 Claims, 3 Drawing Sheets

METHOD OF MAKING COFFEE AND COFFEE MAKER

FIELD OF THE INVENTION

The invention relates to methods of making coffee and to coffee makers, and in particular to drip-type coffee makers.

BACKGROUND OF THE INVENTION

One method of making coffee includes passing heated water through coffee grinds in order to infuse the water with coffee flavour and aroma. A common type of coffee maker that employs this method is the so-called "rip-type" coffee maker.

In order to make good coffee the water temperature should be at substantially 95° C. for 95% of the brew time, and the coffee the water should evenly wet the grinds.

Drip-type coffee makers comprise a water reservoir and a brew basket for receiving coffee grinds. A delivery tube or other water passage takes water from the water reservoir, through an in-line water heater and delivers it to a spreader above coffee grinds in the brew basket. The heated water passes through the coffee grinds and into a carafe. There are two problems associated with the above method.

Firstly, the heated water must pass through delivery tubes and the air gap between the spreader and brew basket before reaching the coffee grinds. During this time substantial heat can be lost from the water, particularly during the early stages of brewing when the delivery tube and air gap have not had time to heat up. Thus, the water temperature in the brew basket will always be lower during the initial stages of the brewing cycle. This lowers the temperature of the final coffee beverage and affects its quality.

Secondly, the spreader attempts to distribute the heated water evenly over the coffee grinds however, the heated water generally flows through the centre portion of the brew basket. There is typically less wetting of the coffee grinds at the outer edges of the brew basket. This results in uneven extraction of the coffee grinds and has an adverse affect on the quality of the coffee beverage.

SUMMARY OF THE INVENTION

It is an object of the present invention to overcome or ameliorate the above disadvantages, or at least to provide the public with a useful alternative.

According to a first aspect of the invention there is provided a method of making coffee in a drip-type coffee maker including introducing steam into coffee grounds, and passing heated water through the coffee grounds to infuse the water.

According to a second aspect of the invention there is provided a coffee maker including
 a water reservoir,
 a brew basket for receiving coffee grinds,
 an in-line water heater,
 a first water passage between the reservoir and the brew basket, the first passage passing through the in-line water heater for delivering heated water to the brew basket, and
 a second water passage between the reservoir and the brew basket, the second passage passing through the in-line water heater and the flow rate in the second passage being controlled so that water from the reservoir is converted into steam for delivery to the brew basket, wherein the steam enters the brew basket below the level of any coffee grinds in the basket.

Preferably, the steam is released into the brew basket to cause a substantially helical flow path.

Preferably, the brew basket includes a passage for steam communication with the second water passage, the passage having an aperture proximate the base of brew basket.

Preferably, there are two in-line water heaters, one for each water passage.

Further aspects of the invention will become apparent from the following description, which is given by way of example only.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

Figure 1:
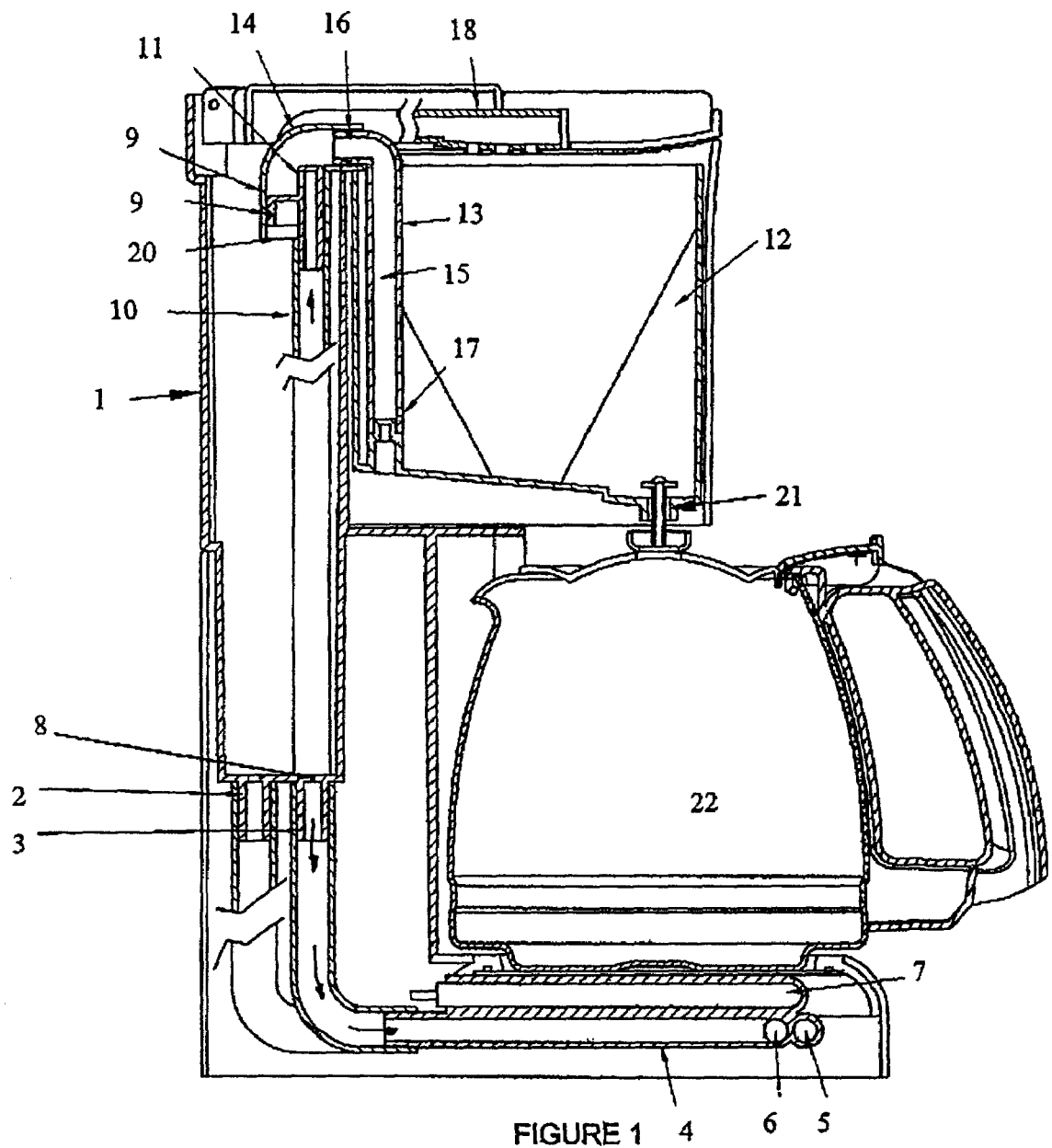
FIG. 1 illustrates a sectional view through a drip-type coffee maker according to the invention.

The invention provides for a method of making coffee in a drip-type coffee maker wherein before and/or at least at the same time that heated water is passed through the coffee grinds steam is introduced into the coffee grinds to heat the coffee grinds and to create a stirring motion which causes a more even extraction of the coffee grinds.

A drip-type coffee maker for use in the invention includes a water reservoir 1 for storage of water to be heated. The reservoir 1 has a primary water outlet tube 2 and a secondary water outlet tube 3 at its bottom end.

An in-line water heater 4 doubles as a carafe hot plate 7. The in-line water heater 4 has two heating paths through it for receiving a first water passage 5 from the primary water outlet 2 and a secondary water passage 6 from the secondary water outlet 3.

The first water passage 5 passes through the in-line heating 4 and up to a spreader 18, which is position above a brew basket 12. From the spreader, heated water is distributed over coffee grinds (not shown) in the brew basket in known manner. The water flows through the grinds and infused water drains from the brew basket 12 through an aperture 21 and into a coffee carafe 22.

Figure 2:
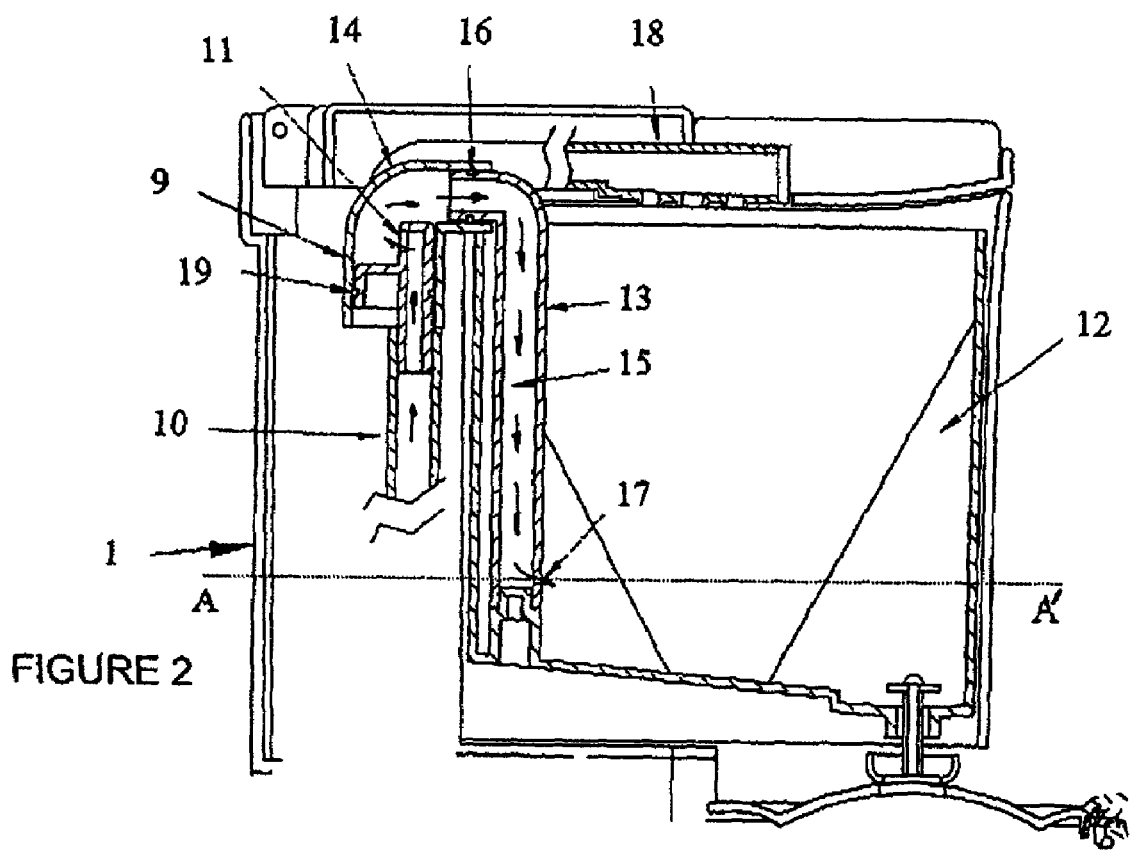
FIG. 2 illustrates a detail sectional view through the steam nozzle and brew basket of the coffee maker.

Referring to FIG. 2, the brew basket 12 has a steam passage 15 in the form of steam spreader tube 13 down one of its sides. At the lower end of the steam tube 13 is an aperture 17 for the release of steam into the lower portion of the brew basket 12. The aperture 17 is located so that in use it is below the level of coffee grinds in the brew basket 12.

At the top of the brew basket 12 the steam tube 13 is received into an intake tube 14 and sealed therein by an O-ring 16. Steam tube 13 is removably engaged with intake tube 14 so that brew basket 12 can be removed for cleaning.

The second water passage 6 also passes through the in-line heater 4. The secondary outlet 3 only has a small aperture 8 leading from the water reservoir 1. This controls the water flow rate in secondary water passage 6 to a very slow flow rate. Because of the slow flow rate in the secondary water passage 6 the water is turned to steam in in-line heater 4.

A steam delivery tube 10 carries this steam from in-line heater 4 to a steam nozzle 9 received within intake tube 14. An O-ring 19 seals nozzle 9 within intake tube 14. Steam is released into intake tube 14 through steam aperture 11. The steam can pass through intake tube 14 to steam spreader tube 13 and into the brew basket through lateral aperture 17.

In use, coffee grinds are disposed within the brew basket 12 and will extend to a level above lateral steam aperture 17. The water reservoir 1 is filled with water and the coffee maker is turned on. Water in both water passages 5, 6 heats up. Water in first passage 5 will be heated and will rise up to spreader 18 and be delivered to the coffee grinds in known manner. This hot water flows through the coffee grinds and into the carafe 22 via aperture 21.

At the same time, water in secondary passage 6 is heated, but turns to steam due to the controlled flow rate. The steam rises up delivery tube 10 to intake tube 14 and into steam tube 13 within brew basket 12. Steam is released through steam aperture 17 and into the coffee grinds. The steam acts to introduce additional heat into the coffee grinds to maintain the desired temperature especially during the initially phases of the brewing cycle.

Figure 3:
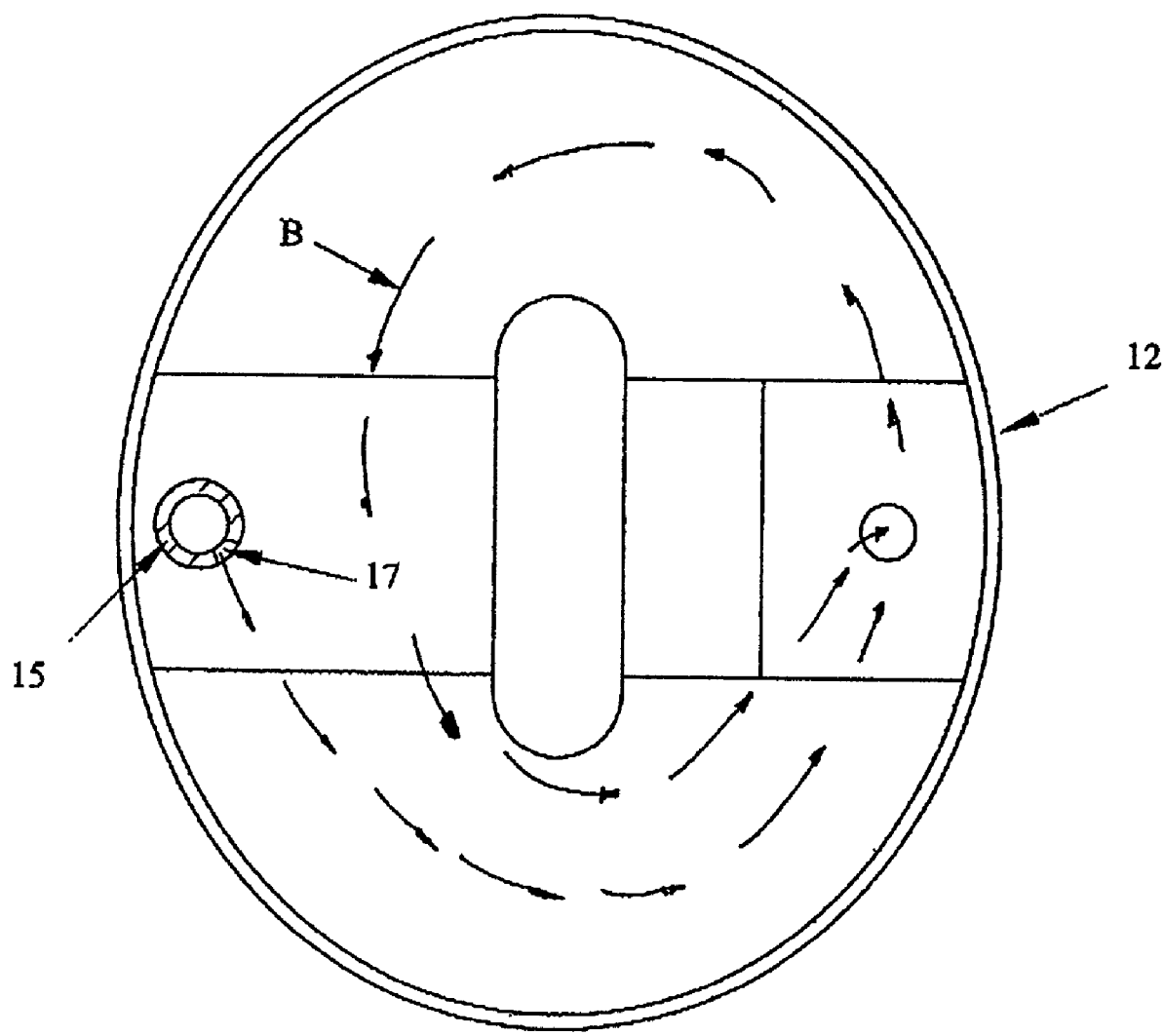
FIG. 3 illustrates the circular helical flow path of the steam in the brew basket.

Referring to FIG. 3, a plan sectional view through A A' of FIG. 2 is shown. Steam aperture 17 is located in the wall of steam tube 13 so as to cause a helical type steam flow within the brew basket as indicated by the arrows B. This causes a stirring motion through the coffee grinds and results in more even wetting and extraction of the grinds.

By the introduction of the steam into the coffee grinds during the brew cycle the temperature in the coffee grinds is maintain at an optimal temperature for extraction, and the wetted coffee grinds are stirred by the turbulence of the helical steam flow along the walls of the brew basket. This results in more even wetting and extraction of the coffee grinds.

In an alternative embodiment the coffee maker has two separate water heaters: one for heating water in first water passage 5, and a second for creating steam in steam delivery tube 10. Another embodiment has a valve for controlling the rate of water flow in second passage 6. Yet a further embodiment has a controlled valve or other means to delay water flow in first passage S. This provides for steam heating of the coffee grinds before heated water is allowed pass through the grinds. The provision of such alternative embodiments is within the ability of the skilled addressee.

Where in the foregoing description reference has been made to integers or elements have known equivalents then such are included as if individually set forth herein.

Embodiments of the invention have been described, however it is understood that variations, improvement or is modifications can take place without departure from the spirit of the invention or scope of the appended claims.

We claim:

1. A coffee maker including
a water reservoir,
a brew basket for receiving coffee grinds,
an in-line water heater,
a first water passage between the reservoir and the brew basket, the first passage passing through the in-line water heater for delivering heated water to the brew basket, and a second water passage between the reservoir and the brew basket,
the second passage passing through the in-line water heater and the flow rate in the second passage being controlled so that water from the reservoir is converted into steam for delivery to the brew basket, wherein the steam enters the brew basket below the level of any coffee grinds in the basket.

2. A coffee maker as claimed in claim 1 wherein steam is released into the brew basket to cause a substantially helical flow path.

3. A coffee maker as claimed in claim 1 wherein the brew basket includes a passage for steam communication with the second water passage, the passage having an aperture proximate the base of brew basket.

4. A coffee maker as claimed in claim 1 wherein there are two in-line water heaters, one for each water passage.

5. A coffee maker including
a water reservoir,
a brew basket for receiving coffee grinds,
an in-line water heater,
a first water passage between the reservoir and the brew basket, the first passage passing through the in-line water heater for delivering heated water to the brew basket, and
a second water passage between the reservoir and the brew basket, the second passage passing through the in-line water heater and the flow rate in the second passage being controlled so that water from the reservoir is converted into steam for delivery to the brew basket, wherein the steam enters the brew below the level of any coffee grinds in the basket to cause a substantially helical steam flow path therein.

6. A coffee maker, as claimed in claim 5, wherein the steam enters the brew basket below the level of coffee grinds in said brew basket.

* * * * *